United States Patent [19]

Samuels

[11] Patent Number: 4,842,289

[45] Date of Patent: Jun. 27, 1989

[54] PORTABLE SKI LOCKER

[76] Inventor: G. Kevin Samuels, 7513 Fountain Ave., #310, Los Angeles, Calif. 90046

[21] Appl. No.: 147,150

[22] Filed: Jan. 22, 1988

[51] Int. Cl.$^4$ .............................................. B62B 13/18
[52] U.S. Cl. ........................................ 280/8; 70/58; 70/DIG. 63; 280/47.19; 280/47.26; 280/809; 280/814
[58] Field of Search ................... 280/809, 814, 815, 8, 280/13, 47.19, 47.26; 70/284, 58, 62, DIG. 63; 312/324, 326

[56] References Cited

U.S. PATENT DOCUMENTS

| | | | |
|---|---|---|---|
| 157,837 | 12/1874 | Joyce | 280/8 |
| 1,592,405 | 7/1926 | Worley, Jr. et al. | 70/DIG. 63 |
| 1,806,031 | 5/1931 | Vignos | 70/DIG. 63 |
| 2,883,731 | 4/1959 | Wells | 280/47.19 |
| 3,006,709 | 10/1961 | Krey | 312/324 |
| 3,018,897 | 1/1962 | Carlyle | 280/814 |
| 3,086,688 | 4/1963 | Vikre | 280/814 |
| 3,330,573 | 7/1967 | Sieloff | 70/58 |
| 3,504,921 | 4/1970 | Osmond | 280/8 |
| 3,604,228 | 9/1971 | Conlon | 70/58 |
| 4,114,915 | 9/1978 | Lello et al. | 280/814 |
| 4,131,289 | 12/1978 | Maller | 280/814 |
| 4,268,050 | 5/1981 | Kennedy, Sr. | 280/814 |

FOREIGN PATENT DOCUMENTS 1391209  1/1965  France .................... 70/58

Primary Examiner—Charles A. Marmor
Assistant Examiner—Eric Culbreth
Attorney, Agent, or Firm—Bruce L. Birchard

[57] ABSTRACT

A mobile ski locker comprises an enclosed cabinet, The cabinet having a frame with interconnected vertical and horizontal members and panels carried thereon, all of the panels except the front panel being fixed in position, the front panel including a hinge to form a door for the cabinet, the door being securable in a closed position by a combination lock and a key-operated lock, skis and ski poles being selectively secured to the rear panel of the cabinet by clamps having locks which are operable by the same key as that which opens the key operable lock on the door of the cabinet, the cabinet having an upper compartment and a lower compartment for wet items, the floor of the compartment being perforated to promote water drainage, the cabinet being made mobile over wet, dry or snow-covered surfaces by reason of the combination of wheels and runners secured to the cabinet at its lower rear edge, a collapsible handle being provided for easy movement of the locker.

4 Claims, 1 Drawing Sheet

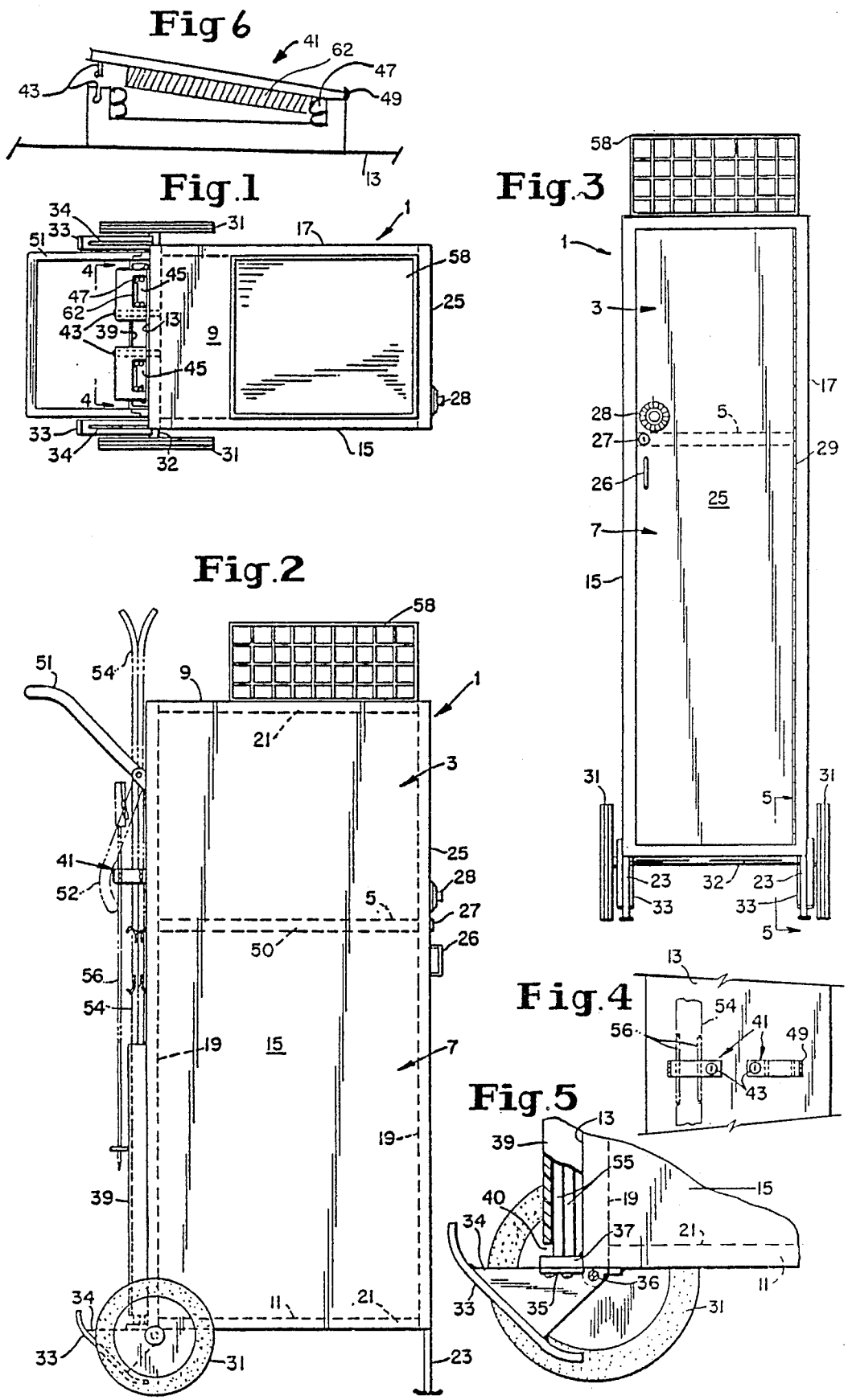

PORTABLE SKI LOCKER

BACKGROUND OF THE INVENTION

1. Field of the Invention

This invention relates to sporting goods and, more specifically, to apparatus for use in connection with the sport of skiing.

2. Prior Art

Past inventions have attempted to satisfy the need for skiers to transport and store ski paraphernalia. They performed various functions, such as, containing and aiding the transporting of basic ski equipment, (U.S. Pat. No. 4,268,050). Such a device allows transport over snowy and dry terrains but offers no protection from the elements. Another prior invention allows transport with ease by hand or on the top of a car, (U.S. Pat. No. 4,114,915), however, it also does not protect the condition of the ski equipment and accessories. Other prior inventions merely attach skis, boots, and ski poles to a balanced grip for easy handling, (U.S. Pat. No. 3,086,688), or are themselves simple attachment devices to aid in the transport of ski equipment on the roofs of automobiles, (U.S. Pat. No. 3,018,897).

This invention is neither a mounting device nor an open air storage containment device used for the sole purpose of manually rolling equipment from one location to another, (U.S. Pat. No. 4,268,050). The subject invention is not designed to merely carry skis, poles and boots and then provide a mere vertical or horizontal space for storage accessible to the elements, (U.S. Pat. No. 4,114,915).

SUMMARY OF THE INVENTION

This invention relates to a portable ski locker for transport and safe storage of skis, ski boots, poles, ski apparel (such as goggles, mittens and hats) and other accessories useful to skiers. This invention is useful for up to two skiers. The portable ski locker is movable over snow, ice, pavement or dirt.

My portable ski locker includes an elongated frame support extending in a vertical direction and having attached thereto a two-tiered enclosed compartment locker system having dual locking means, one operated by key and the other operated by manual adjustment of a combination lock. The portable ski locker is transported by means of a handle which extends transversely to the elongated frame support and folds out of the way when not in use. Attached alongside the rear of the two-tiered compartment is a lockable pole and ski enclosure which contains skis and poles vertically positioned alongside the major elongated frame member. The portable ski locker is mobile by reason of wheels attached to the major elongated frame member and when stationary rests on the front support legs attached to a forward extension of the elongated frame member.

The portable ski locker, according to my invention, can accommodate four poles, four skis, four boots and the wet and dry accessories. The key for the door of the locker is also utilized as the key for the ski and poke enclosure and disengages the clamping device which secures the skis and poles. The clamping device is attached to the major elongated frame member beneath the rear folding handle and secures skis in a locked position until disengaged.

BRIEF-DESCRIPTION OF THE DRAWINGS

This invention shall not be limited to the precise arrangement and instrumentalities shown wherein:

FIG. 1 is a top plan view of the portable ski locker;

FIG. 2 is a side elevational view of the portable ski locker;

FIG. 3 is a front elevational view of the portable ski locker;

FIG. 4 is a fragmentary elevational view of the rear panel and the clamping device taken along Lines 4—4 of FIG. 1.

FIG. 5 is a fragmentary cross-section of the wheel/-ski combination taken approximately along Lines 5—5 of FIG. 3.

FIG. 6 is a fragmentary cross-section of the preferred embodiment of the locking means taken approximately along Lines 4—4 of FIG. 1.

DETAILED DESCRIPTION OF THE DRAWINGS

Referring now to FIGS. 1-3, there is shown a portable ski locker 1 for transportation and storage of ski equipment and accessories enclosed by two side panels 15 and 17, a rear panel 13, a top panel 9, a bottom panel 11 and a door 25 attqached to a vertical hinge 29. The panels 15, 17, 13 and 9 extend in a planar fashion and join at right angles to form a container having a rectangular contour. The top panel 9 forms a shelf upon which a removable basket 58 may be placed for extra storage capacity. The removable basket 58 may be stored inside the portable ski locker 1 during transport of the portable ski locker 1 to and from the ski area. The bottom panel 11 forms a shelf or floor for the lower compartment 7 and is perforated to allow drainage for water which seeps from wet items stored therein.

The portable ski locker is accessed and secured by a door 25 having of locking means 27 which is key operated or alternate locking means 28 which utilizes a combination lock.. The portable ski locker 1 is divided into two compartments, one upper compartment 3, which comprises about one-third of the total compartment area, and one lower compartment 7, which comprises approximately two-thirds of the total compartment area, as seen in FIGS. 2 and 3. The lower compartment 7 extends down to the wheel axle 32, to maximize the use of vertical space and directly supports front legs 23 for greater strength and lower cost. the portable ski locker 1 is made rigid by two parallel and vertical elongated frame members 19 which intersect at right angles with two parallel and horizontal frame members 21 to form a rectangular contour. A compartment divider shelf 5 includes horizontal support members 50, disposed between frame members 19 along opposite side panels 15 and 17, respectively. Shelf 5 extends in a horizontal direction from elongated frame members 19 in planar fashion until it intersects the inside walls of the compartment area to provide a flat surface for efficient storage capacity. The portable ski locker 1 rests upon front support legs 23 which extend downward at the front lower corners of locker 1 adjacent to the wheels 31. The lower horizontal frame members 21 and the front support legs 23 form right angles when viewed from the front of locker 1.

Turning to FIG. 5, shown attached to and extending in a vertical direction from the outermost corners of the rear elongated frame members 19 are wheels 31 which assist in supporting and mobilizing the portable ski locker 1. The wheels are attached to and rotate on an axle 32 fixed to the lower horizontal frame member 21, axle 32 extends through the gussets 34 for extra support. the gussets 34 are removably attached to welded flanges 37. Welded flanges 37, which are welded at right angles to the rear elongated frame members 19, form a base on which the skis 54 rest. Welded to the gussets 34 in a transverse 45 degree angle from the vertical rear elongated frame members 19 are ski runner members 33 which provide mobility over snowy terrain.

Now, turning to FIGS. 1 and 2, the rear panel 13 supported by elongated frame members 19 carries along its planar outer surface, the ski (shown in phantom as element 54) and pole (shown in phantom as element 56) transport and securing system which comprises a ski enclosure 39 mounted on the rear panel 13 extending in a vertical direction approximately two-thirds of the distance from the top panel 9 to the bottom panel 11, as shown in FIG. 5, coming just short of meeting flange 37, thereby leaving an opening for drainage. Mounted to the rear panel 13 and midway between the top of the ski enclosure 39 and the top panel 9 is a clamping device 41, as seen in FIGS. 1, 4 and 6, utilized as a safe storage and locking system for skis and poles. The clamping device 41 comprises a locking means 43 operable by the same key as that utilized to operate locking means 27. As seen in FIGS. 1 and 6, the clamping device 41 encloses an opening which is the ski-receiving portion 45 of the portable ski locker 1 and as a preferred embodiment can be lined with rubber or similar material 62 which protects the wood surface and secures the skis 54 in place as seen in FIG. 6. Adjacent to and outside of the ski holding portion 45 of the clamping device 41 are openings which comprise the ski pole holding portion 47. The locking means 43 extends through the inside portion of the clamping device 41 adjacent to the hinge 49 attachment and bypasses the ski holding portion 45 to activate the locking means 43 which secures the skis 54 and poles 56 within respective openings. Such openings when clamping device 41 is in a locked position, contain skis in locked position by disallowing passage past ski bindings as detailed in FIG. 2.

FIG. 2 shows, attached on the outer surface of the rear panel 13 about one-eighth (⅛) of the distance from the top panel 9, a folding handle 51 which extends in a transverse direction at 45 degrees in full-open position and which can be folded (shown in phantom as element 52) to reduce the space needed to transport the portable ski locker 1 to and from the ski area.

While a particular embodiment has been shown and described, it will be apparent to those skilled in the art that modifications may be made therein without departing from the spirit and scope of this invention.

I claim:
1. A portable ski locker device, including:
a container having intercoupled front, back and side vertical panels and top and bottom horizontal panels;
opposed front and back vertical frame members joined to each other by opposed, horizontal top and bottom frame members for supporting said vertical panels and horizontal panels, respectively;
said front vertical panel having a door portion and a fixed portion, said door portion being rotatably supported from said fixed portion to permit opening of said container;
first locking means supported in said door portion and rotatable therewith;
second locking means supported in said fixed portion of said front panel and positioned for cooperation with said first locking means when said door portion is in a closed position;
ski-retaining means carried by the outer surface of said back panel of said container, said ski-retaining means including at-least-one hinged member for encompassing skis transversely, said at-least-one hinged member including third locking means for selectively securing skis therein;
a support flange welded to said back vertical frame members in alignment with said hinged members;
gusset means removably secured to said support flange;
said gusset means terminating at their ends remote from said support flange, in runner members, said runner members being oriented at an angle to said vertical frame members;
said bottom panel member being perforated.

2. Apparatus according to claim 1 which includes, in addition, wheel means supported from said horizontal bottom frame members.

3. Apparatus according to claim 1 in which said locking means includes a key operable portion and said third locking means is key operated and can be actuated by the same key and said key operable portion of said first locking means.

4. Apparatus according to claim 1 in which said first and second locking means includes both a combination lock and a key operated lock.

* * * * *